United States Patent [19]

Hattori et al.

[11] 4,154,524
[45] May 15, 1979

[54] COPYING APPARATUS FOR THICK AND SHEET ORIGINALS

[75] Inventors: Hiroyuki Hattori, Inagi; Katsuichi Shimizu, Hoya; Hirotoshi Kishi, Tokyo; Hiroshi Ogawa, Kawasaki; Kazumi Umezawa, Kawasaki; Seiji Sagara, Kawasaki, all of Japan

[73] Assignee: Canon Kabushiki Kaisha, Tokyo, Japan

[21] Appl. No.: 824,795

[22] Filed: Aug. 15, 1977

[30] Foreign Application Priority Data

Aug. 27, 1976 [JP] Japan ................................. 51-102804

[51] Int. Cl.² ...................... G03B 27/34; G03B 27/40; G03B 27/70
[52] U.S. Cl. ........................................ 355/57; 355/8; 355/11; 355/51; 355/60
[58] Field of Search .................... 355/8, 11, 49, 51, 57, 355/60, 65, 66

[56] References Cited

U.S. PATENT DOCUMENTS

| 3,377,913 | 4/1968 | Grant, Jr. ........................ 355/49 X |
| 3,957,685 | 5/1976 | Goshima et al. .................. 355/49 X |
| 4,080,064 | 3/1978 | Komori et al. ........................ 355/51 |

Primary Examiner—Richard A. Wintercorn
Attorney, Agent, or Firm—Fitzpatrick, Cella, Harper & Scinto

[57] ABSTRACT

A copying apparatus comprises an original supporting carriage for supporting thereon a stationary original, original feeder for feeding an original past an exposure station first scanning optical system comprising illumination lamps, mirrors and a lens for projecting onto a photosensitive medium the image of the original resting on the original supporting carriage, and second scanning optical system comprising illumination lamps, mirrors and a lens for projecting the image of the original onto the photosensitive medium. The photosensitive medium has thereon a common image focus position for two modes effected by the first and the second scanning optical systems.

3 Claims, 10 Drawing Figures

COPYING APPARATUS FOR THICK AND SHEET ORIGINALS

BACKGROUND OF THE INVENTION

1. Field of the Invention

This invention relates to an improved copying apparatus. More particularly, it relates to a two-mode copying apparatus having an original supporting carriage (the term "original supporting carriage" used here covers a stationary original holder and a reciprocable original holder) for supporting thereon a stationary original (which means an original held on the original supporting carriage) and an original feeding system for feeding originals past an exposure station.

2. Description of the Prior Art

Heretofore, various attempts have been made to improve the handling originals in copying machines. It has also been proposed to add an automatic sheet original feeding device to an ordinary copying machine by noticing the fact that the handling of originals in sheet original copying machines is ready to be automatized. An example is disclosed in Japanese Patent Publication No. 26068/1976. This is a copying machine simply equipped with a sheet original feeding device, but automatization of such feeding device has also been put into practice. An embodiment of this system according to the prior art is shown in FIGS. 1 and 2 of the accompanying drawings. Designated by a is an original supporting carriage on which a thick original, if to be copied, may be placed by opening a pressure cover a'. Depression of the copy button b causes automatic reciprocation of the original carriage a, thus providing a copy. On one end of the original supporting carriage, a sheet original feeding station c is formed integrally therewith, so that sheet originals may be inserted into this feeding station to thereby obtain copies. This is excellent in that it uses an original illumination system and an optical system in common for both types of originals, whereas the original supporting carriage a integral with the sheet feeding station c is so heavy that a problem tends to occur when effecting the reciprocation of the original supporting carriage smoothly and accurately. Further, a model equipped with an automatic sheet original feeding device would be too heavy to effect the reciprocation of the carriage. Thus, in order that the reciprocation may be effected, the automatic feeding device must be designed as a detachable structure. This is also necessary in view of the fact that the close spacing between the sheet feeding station c and the thick original supporting carriage a permits interference therebetween. Even in a model having no automatic sheet feeding (FIG. 2), interference of the sheet original feeding device would occur when a portion of a large-sized thick original is to be copied. In fact, the practical model shown there is also so designed. This would necessarily result in reduced operability. Moreover, the requirement for even the sheet original inserting portion to be reciprocable leads to an increased stroke of the reciprocating movement.

If commercially broad requirements are to be met, it would be possible to think out of this embodiment a less expensive model from which the sheet feeding station of such special specification is removed. This model, however, would be irrational because it would have an unnecessarily rigid reciprocating guide device which would in turn lead to an unnecessarily great stroke of reciprocation.

A stationary original carriage type model (in which the optical system is reciprocable) is disclosed in U.S. Pat. No. 3,833,296. In an embodiment thereof, interference tends to occur between the original supporting portion and the sheet original feeding station as in the above-described examples, and the stroke of reciprocation of the optical system is great. Another embodiment shown there is complex in construction of the optical system and accordingly, not practical from the manufacturing point of view.

In addition, the concepts disclosed in these models cannot be developed beyond the automatic sheet original feeding device.

SUMMARY OF THE INVENTION

It is an object of the present invention to provide diverse and broad functions in addition to the basic functions of an ordinary copying apparatus without impeding such basic functions.

It is another object of the present invention to provide a copying apparatus which is capable of copying books or other thick originals and yet capable of copying sheet originals by automatically feeding sheet originals by the use of an automatic sheet original feeding device.

It is still another object of the present invention to provide a copying apparatus which is capable of enlarged or reduced scale copying when sheet original feeding device is in use.

It is yet still another object of the present invention to provide a copying apparatus which permits advent of a model equipped with other functions (such as, for example, a microfilm reader-printer) instead of the automatic feeding device.

It is a further object of the present invention to provide a copying apparatus which is additionally endowed with these functions without its mechanism as a standard copying apparatus suffering from any increased duty and accordingly is of very high reliability also as an ordinary copying apparatus.

It is a further object of the present invention to provide a copying apparatus which is capable of copying from over-sized originals by utilizing its function of reduced scale copying.

It is a further object of the present invention to provide a copying apparatus which is also capable of copying from microfilm by utilizing its function of enlarged scale copying.

A specific form of the present invention is a copying apparatus which comprises an original supporting carriage for supporting thereon a stationary original, and an original feeding system for feeding an original past an exposure station, and further has a first scanning optical system comprising illumination lamps, mirrors and a lens for projecting the image of the original resting on the original supporting carriage, and a second scanning optical system comprising illumination lamps, mirrors and a lens for projecting the image of the original fed by the original feeding system. The image focus positions of the originals in the two modes by the first and the second optical system are common with each other.

In addition to such construction, the copying apparatus of the present invention may be constructed to have various functions: for example, the original feeding system is designed as an automatic sheet original feeding mechanism capable of automatically feeding a plurality of originals; the second scanning optical system is endowed with the function of reduced scale copying; or the second scanning optical system is endowed with the function of enlarged scale copying.

The invention will become more fully apparent from the following detailed description of the accompanying drawings.

DESCRIPTION OF THE PREFERRED EMBODIMENTS

Figure 3:
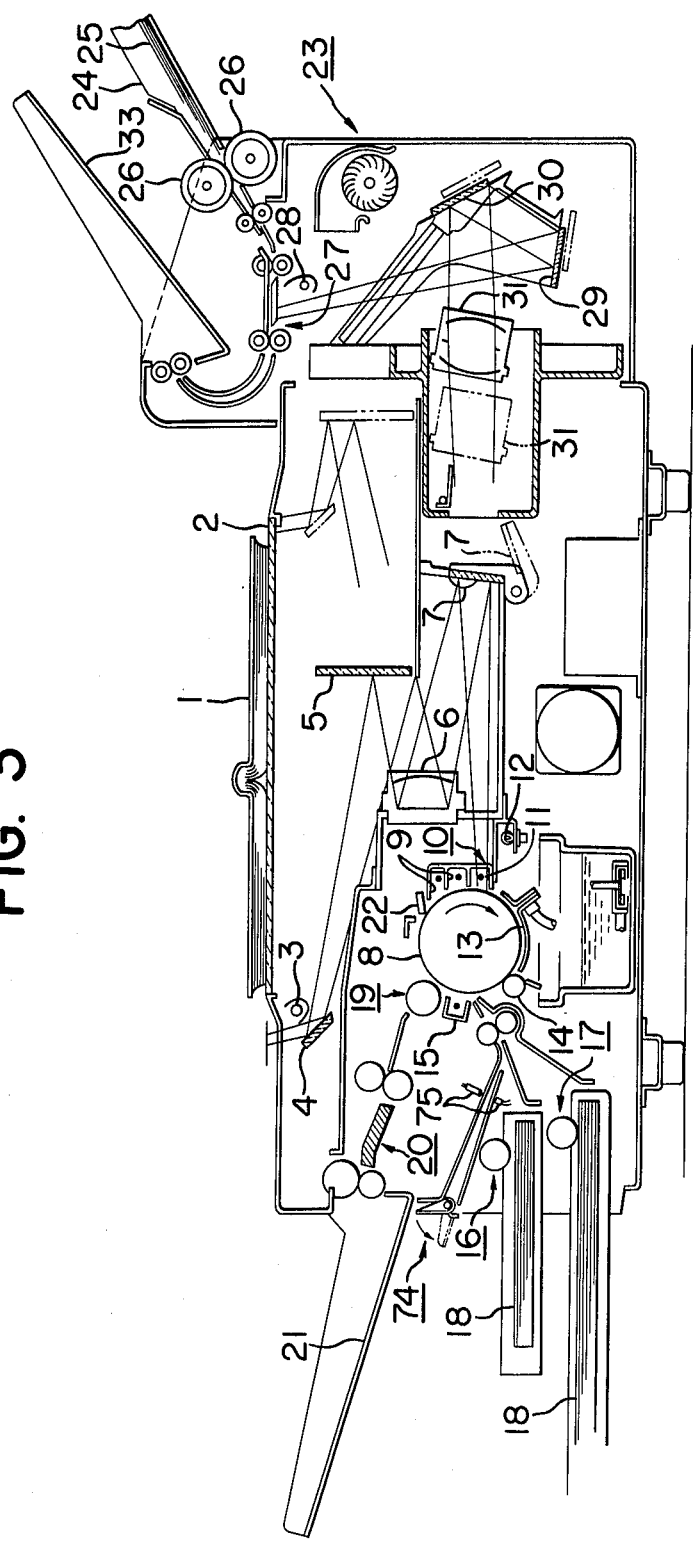
FIG. 3 is a cross-sectional view of an embodiment of the present invention.

Referring to FIGS. 3 to 7, there is shown an embodiment of the copying apparatus according to the present invention. First, the copying process will generally be described. In FIG. 3, an original 1 is placed on an original carriage glass 2 forming an original supporting surface which lies on top of the apparatus housing. The image of the original is formed on a drum 8 through an optical system comprising an illumination lamp 3, a first mirror 4 movable therewith, a second mirror 5 movable at half the velocity of the first mirror 4 and in the same direction therewith, a stationary in-mirror lens 6 and a change-over mirror 7. The surface of the drum 8 provides a photosensitive surface, which is uniformly electrically charged by a primary charger 9 and upon arrival at a focusing station 10, subjected to simultaneous application of the above-described image light and removal of charge by a discharger 11. Subsequently, the drum surface is subjected to whole surface exposure by a whole surface lamp 12, whereby an electrostatic latent image is formed on the drum surface. Next, the latent image is liquid-developed by a developing device 13 and any excess liquid remaining on the drum surface is squeezed off by a squeeze roller 14. The image on the drum 8 is then transferred onto a sheet of copy paper 18 by an image transfer charger 15, the copy paper 18 having been fed there from a paper supply station 16 or 18. The copy paper with the image transferred thereto is separated from the drum surface at a separating station, and guided to a fixing station 20, where the copy paper has the image fixed thereon and then discharged onto a tray. On the other hand, the drum surface is cleaned by a blade cleaner 22 urged thereagainst, thus becoming ready for another cycle.

Description will now be described in detail of a special functional section 23 which is the essential point of the present copying apparatus. In the present embodiment, this section is an automatic sheet original feeding station and can also perform the function of reduced scale copying if required.

On the upper part of this section, there is disposed an automatic feeding device which is commonly known. When sheet originals 25 are placed on a sheet supporting table 24 and a start button (not shown) is depressed, the sheet originals are fed one by one to an exposure station 27 by a set of rollers 26. At the exposure station 27, the original is illuminated by an illumination lamp 28, and the image thereof is projected upon the focusing station on the drum 8 by mirrors 29, 30 and lens 31. When this occurs, the change-over mirror 7 lies at a position retracted from the light path, as indicated by dots-and-dash line 7 (FIG. 3). Detector means 32 comprising a lamp and a light-sensing element for detecting the leading and the trailing end of an original may be disposed before and after the exposure station, thereby accomplishing mechanical control. Finally, the originals after copied are discharged onto a sheet original tray 33.

The copying apparatus of the present embodiment has, above the paper supply station 16, an inlet port (hand insertion port) 74 through which special paper or the like may be inserted. The lid of this port may be opened as indicated by dots-and-dash line and, when special paper or the like is inserted therethrough, it is detected by detector means 75, thus accomplishing special mechanical control. More specifically, register rollers are stopped and thereat, the leading end edge of the special paper is stopped. At the same time, the scanning optical system starts moving and in timed relationship therewith, the register rollers start rotating to feed the special paper. Likewise, where the special functional station 23 is used, the timing rollers feed the special paper with timing after the original has been fed.

Figure 4:
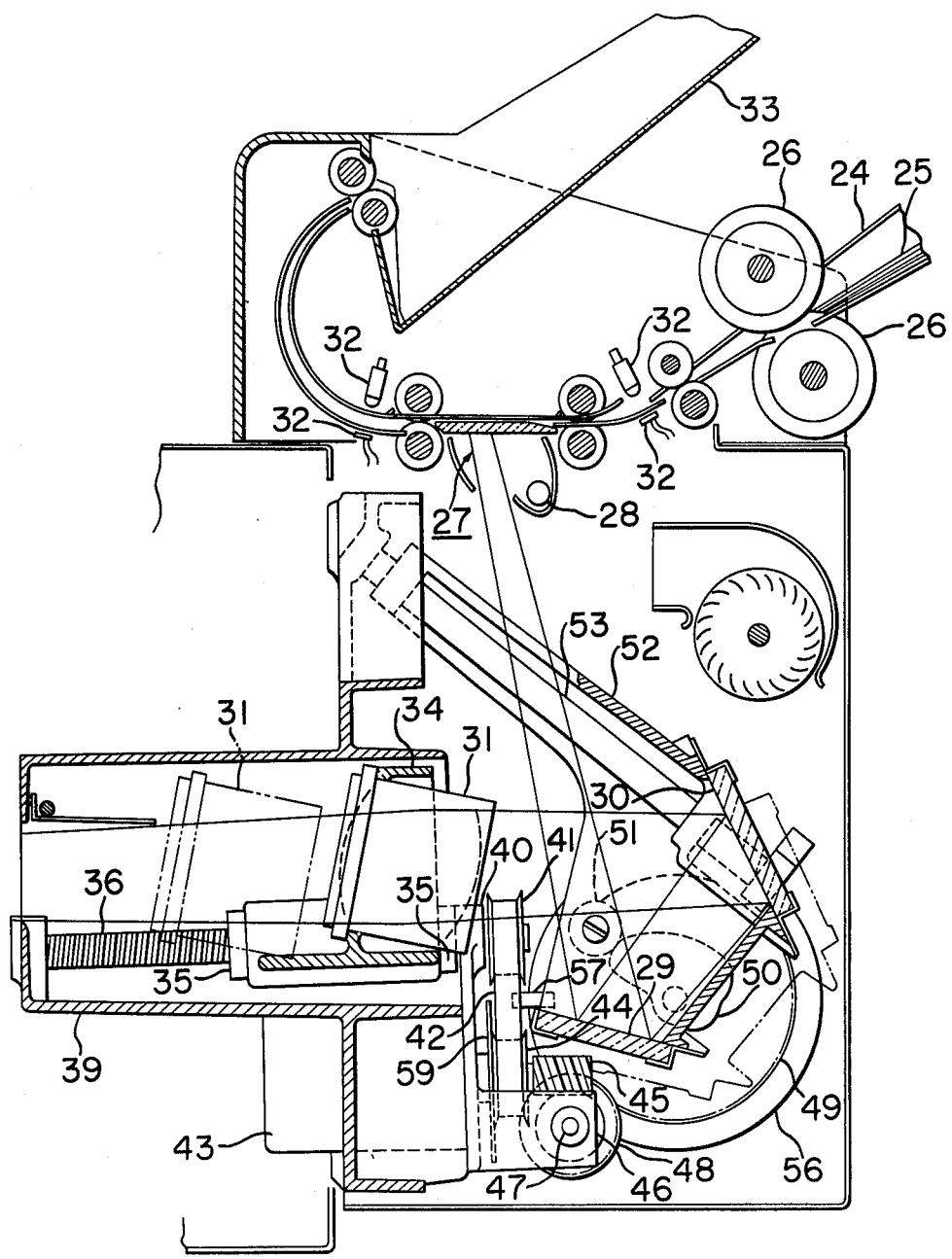
FIG. 4 is a cross-sectional view showing an embodiment of the second scanning optical system in the present invention.

In FIGS. 3 and 4, the mirrors and lens are shown in their positions for the copying at the full-size magnification of 1:1. The present embodiment enables four reduction rates down to 0.707 times (including the full-size magnification). The positions of the mirrors and lens indicated by dots-and-dash lines in FIGS. 3 and 4 are the positions for the magnification of 0.707 times.

Figure 5:
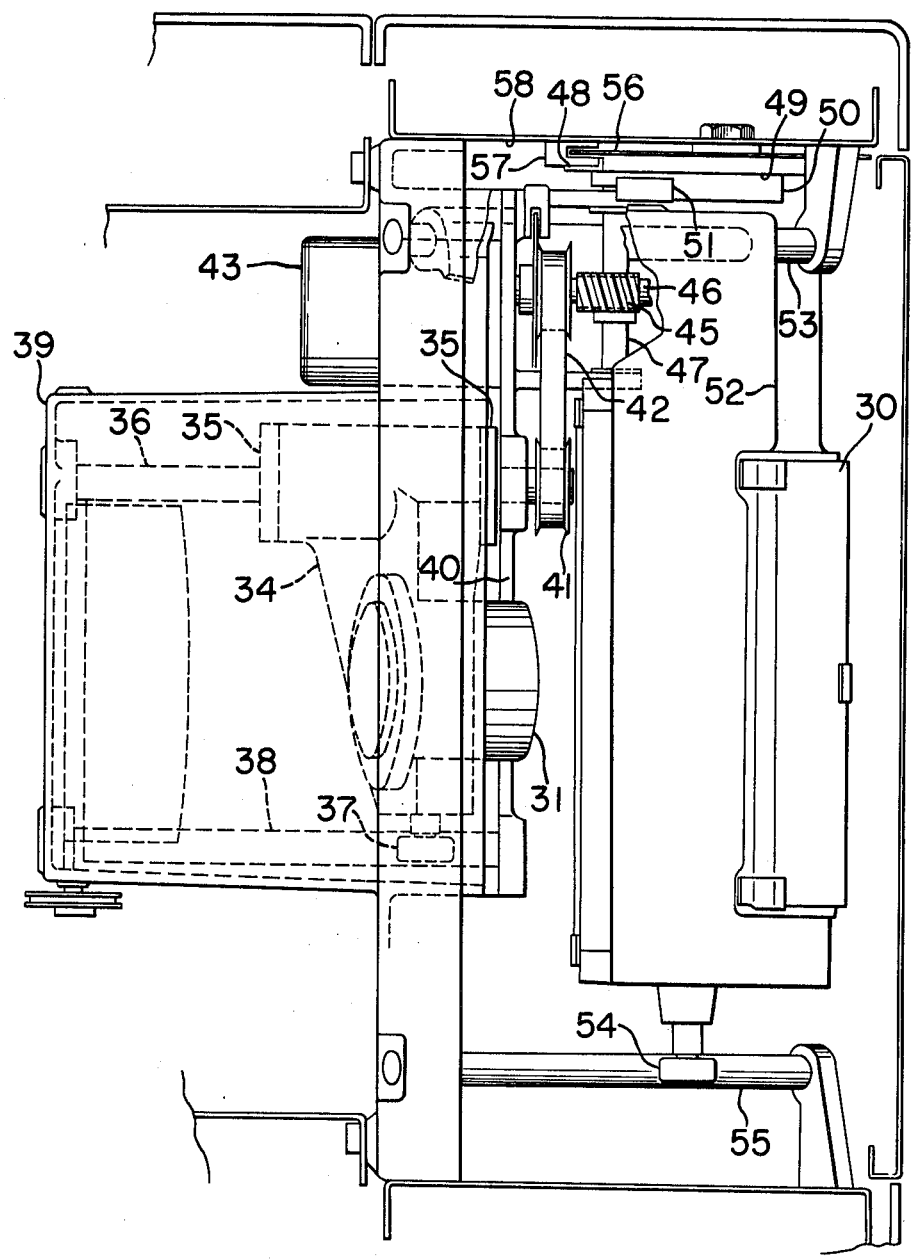
FIG. 5 is a transverse cross-sectional view of the FIG. 4 embodiment.

Referring to FIGS. 4 and 5, the lens 31 is securely mounted on a holder member 34. A ball nut 35 is mounted on one end of the holder member and mates with a ball screw 36, so that rotation of this screw can move the holder member along the light path. A roller 37 (FIG. 5) is securely mounted on the other end of the holder member, and may be guided along a rail 38 parallel to the ball screw. Both ends of the ball screw are journalled to rigid frames 39 and 40 so as not to cause any backlash, and one end of the ball screw has secured thereto a toothed pulley (timing pulley) 41 which is driven. This pulley is driven through a toothed belt 42 from a toothed pulley 44, secured to the output shaft of a variable speed reversible motor 43 having a gear head. On the output shaft of the motor, a worm gear 45 is securely mounted to rotate a cam 50 through the agency of a worm wheel 46, a shaft 47, a gear 48 and a gear 49. The follower 51 of the cam 50 is securely mounted on a holder member 52 which holds mirrors 29 and 30. The holder member 52 has one end thereof mating with a rail 53 and a roller 54 secured to the other end of the holder member 52 may be guided along a rail 55, whereby the holder member 52 may be rectilinearly guided with accuracy. Rotation of the cam 50 moves the follower 51 to thereby compensate for the variation in length of the light path resulting from the displacement of the lens. The follower surface which determines the follower position in accordance with each reduction rate is designed to lie on a concentric circular cylinder from the center of the follower, in the neighborhood of the point whereat the follower then contacts the cam. In other words, even if the stop position of the cam 50 becomes somewhat irregular due to the backlash or the like of the gear, the positions of the mirrors 29 and 30 do not become unstabilized by this.

Figure 1:
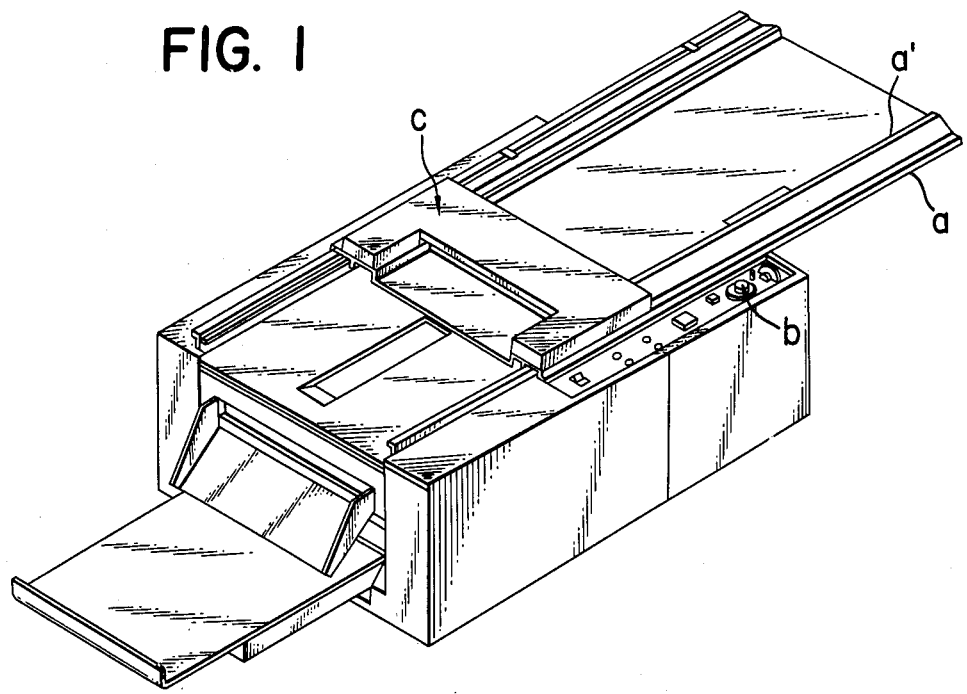
FIGS. 1 and 2 are a perspective view and a cross-sectional view, respectively, showing an embodiment of the prior art.
Figure 6:
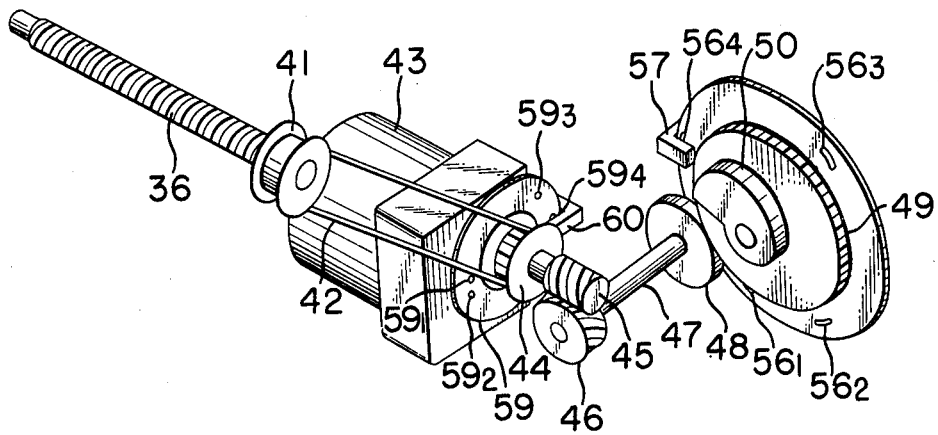
FIG. 6 is a perspective view showing the lens driving portion.
Figure 2:
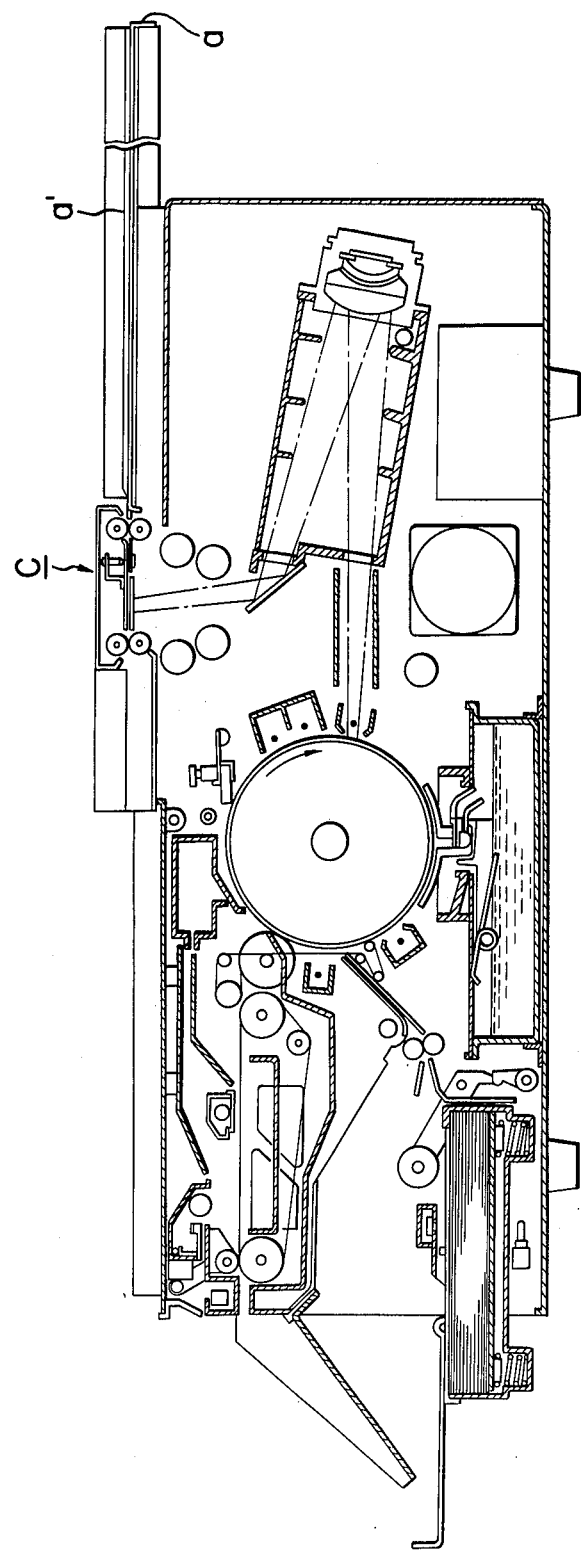

FIG. 6 shows, in perspective view, the drive relationships from the lens driving ball screw 36 to cam 50.

Figure 7:
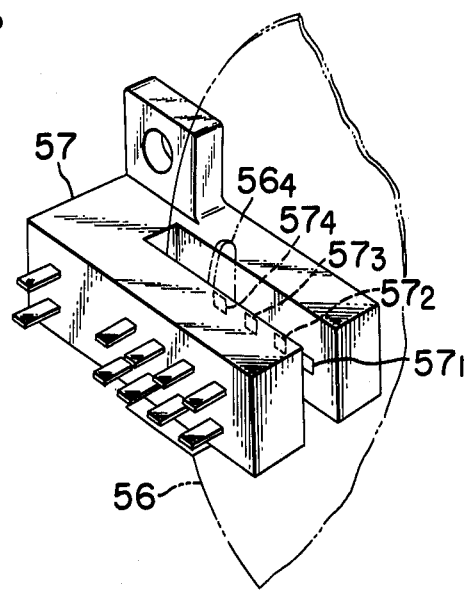
FIG. 7 is a perspective view of a photocoupler unit.
Figure 8:
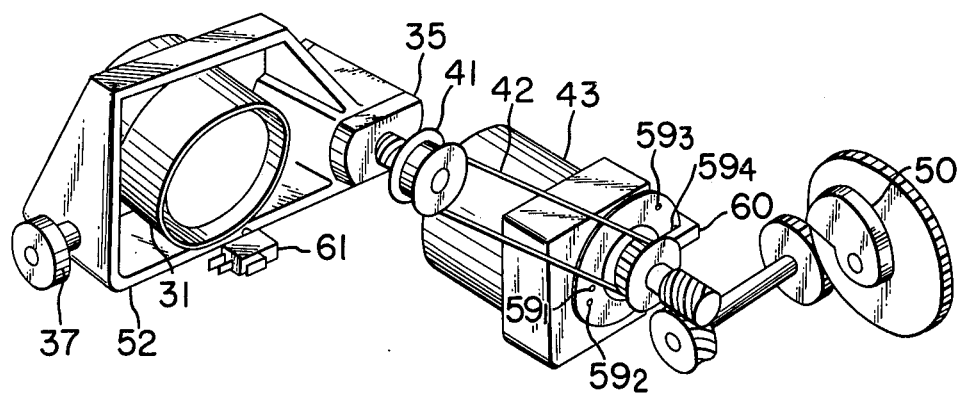
FIG. 8 is a perspective view of another embodiment of the present invention and showing the method of positioning the lens and mirrors.

The positioning of the lenses and mirrors are accomplished in the manner which will hereinafter be described. A disc 56 is mounted on the gear 49, and this disc is formed with four detection holes $56_1$, $56_2$, $56_3$ and $56_4$ for coarse position detection, in accordance with the respective reduction rates. Four photocouplers $57_1$, $57_2$, $57_3$ and $57_4$ for detecting the respective holes and a photocoupler unit 57 shown entirely in FIG. 7 are secured to a frame 58 (FIG. 5). On the output shaft of the motor, there is a precisely positioning disc 59 formed integrally therewith, as well as the pulley 44 and worm gear 45, and this disc is also formed with position detection holes $59_1$, $59_2$, $59_3$ and $59_4$, in accordance with the respective reduction rates. The operation of changing the reduction rate detected by a four-photocoupler unit 60 is accomplished in the following manner. When a reduction rate designating button (not shown) is depressed, the motor 43 starts running at high speed in the direction designated thereby and, when the photocoupler $57_2$ detects a coarse detection hole corresponding to the designated reduction rate, for example, the hole $56_2$, the motor is changed over to a low speed, and then stops running when a precisely positioning hole is detected. Such positioning need not always be effected by the method described above. An alternative method is shown in FIG. 8. In FIG. 8, there is no disc and photocoupler for detecting the position of the cam, but a switch 61 for detecting the stroke end (home position) of the lens 31 is provided. In this instance, when a reduction rate is designated by the button, the lens is rapidly returned to its home position and then reverts, whereby the photocoupler unit 60 counts the number of revolutions of a hole corresponding to the designated reduction rate, for example, the hole $59_2$. Then, before the necessary number of revolutions minus one complete revolution is reached, the motor is changed over to a low speed and when the necessary number of revolutions has been completed, the motor is stopped.

Figure 9:
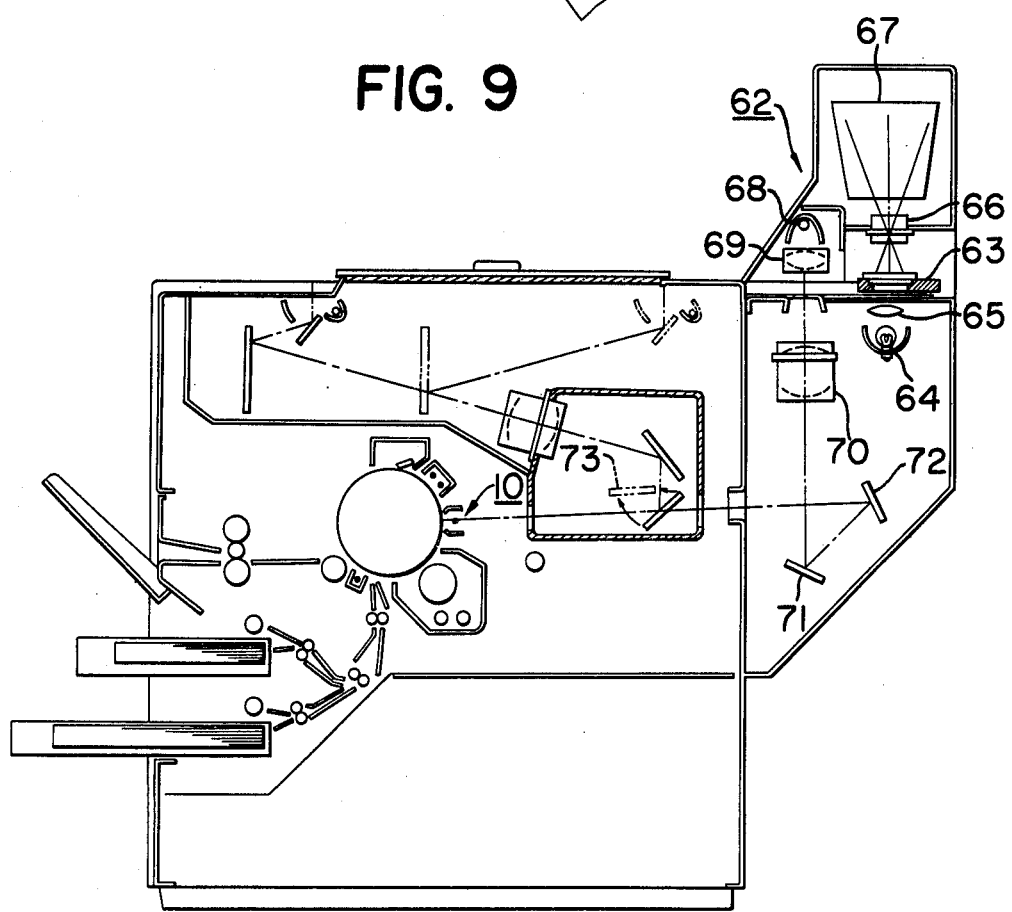
FIG. 9 shows, in cross-section, another embodiment of the present invention.
Figure 10:
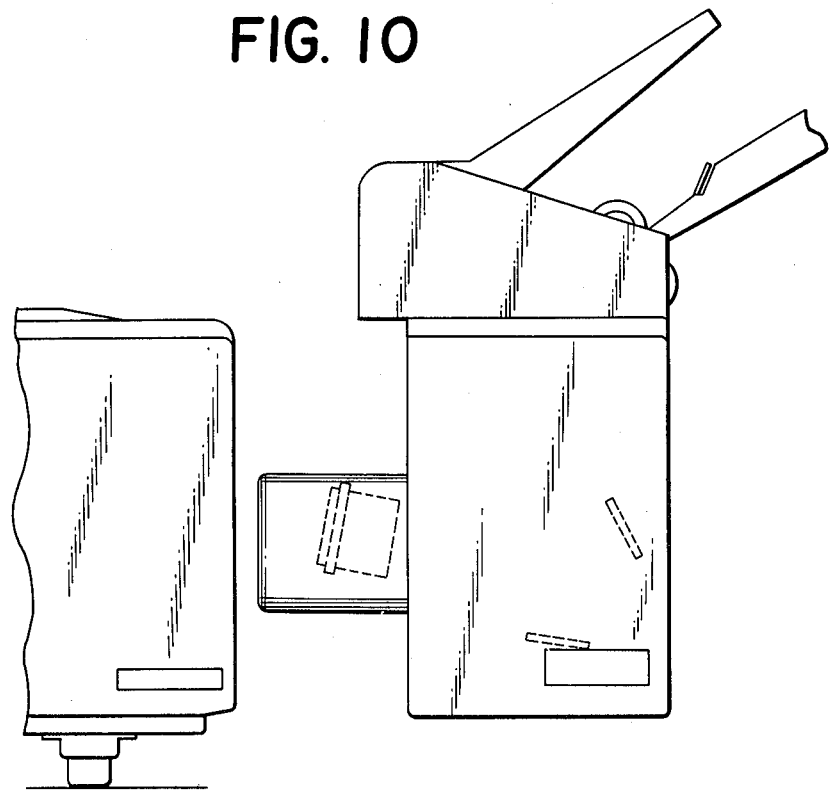
FIG. 10 is a cross-sectional view illustrating the detachability of the second scanning optical system.

FIG. 9 shows another embodiment. The copying process is similar to that of FIG. 3 and need not be described further. In this embodiment, there is provided a special functional section 62 as a microfilm reader printer on the right end. In the home position of a carriage 63, loading of microfilm is possible and an original is illuminated by a lamp 64 through a condenser lens 65 and the image thereof is projected upon a screen (not shown) through a lens 66 and a mirror 67. When it is desired to obtain a copy, a copy button (not shown) is depressed, whereby the carriage is driven leftwardly and the original is illuminated by a lamp 68 through a condenser lens 69 and the image thereof is focused on the focusing station of the drum surface. By this time, a mirror 73 in the apparatus body has been displaced to the position indicated by dots-and-dash line. The copying apparatus of the present invention may be constructed in a form wherein the special functional section is integral with the apparatus body, or constructed in a form as shown in FIG. 10 wherein the special functional section is a detachable unit.

According to the present invention, as has hitherto been described, the major portion of the optical system which is to perform the special function is disposed toward the special functional section and therefore, the major portions of the copying apparatus which are to perform the principal functions may be made most idealistic in design and construction, and may thus be made of high quality and high reliability.

When viewed as a commodity, the present invention can provide a special function to a model having no special functional section but this does not lead to the provision of any irrational portion in the apparatus. Also, if various types of special functional portions are prepared as detachable units, diverse requirements will be met and the commercial value of the invention will be even further increased.

The great distance between the original supporting carriage and the special functional section prevents any interference therebetween. This leads to very excellent operability.

There has heretofore been no machine of the desk top type which has the scale reducing function, but as shown by the FIG. 3 embodiment, the present invention can make even the desk top machines into models having the scale reducing function. It will be apparent that this also holds true of the enlarging function.

In the embodiment described above, the mirrors of the main functional section are displaced and the light path from the special functional section directly reaches the photosensitive drum, but it would readily occur to mind that it is possible to use in common one or two mirrors of the main functional portion. The point of the present invention lies in that the major portion of the optical system of the special functional section which includes the lens is disposed in the special functional section.

What we claim is:
1. A copying machine comprising in combination:
   an original holder for holding a thick original;
   a photosensitive member;
   first optical means, including an illumination lamp, a mirror and a single lens, for forming an image on said photosensitive medium of an original placed on said original holder;
   an exposure station for a sheet original;
   feeding means for feeding a sheet original through said exposure station at an adjustable speed;
   second optical means including an illumination lamp, a plurality of movable mirrors and a single movable lens, for forming an image on said photosensitive member of a sheet original in an enlarged or reduced scale at the same position as that of the image formed by said first optical means; and
   means for moving said plurality of movable mirrors and said single movable lens in synchronism to change the magnification of the image of the sheet original.

2. A copying apparatus according to claim 1, wherein said plurality of movable mirrors includes a pair of mirrors which are movable as a unit.

3. A copying apparatus according to claim 1 wherein said sheet original feeding means and said second optical means are constructed as a unit which is attachable to and detachable from said copying apparatus.

* * * * *